…

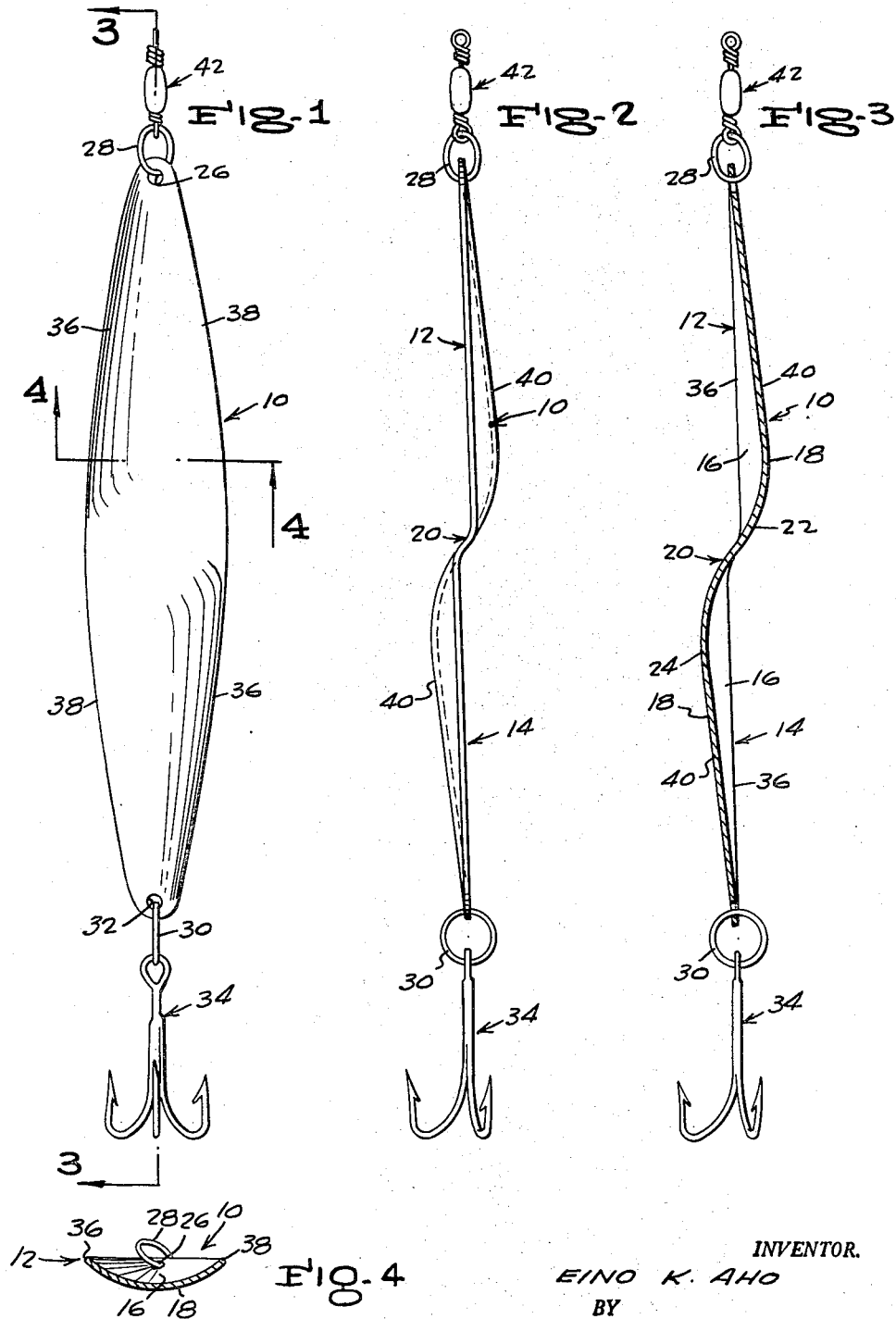

United States Patent Office 3,145,497
Patented Aug. 25, 1964

3,145,497
TROLLING LURE
Eino K. Aho, P.O. Box 123, Ashby, Mass.
Continuation of application Ser. No. 863,347, Dec. 31, 1959. This application Feb. 8, 1963, Ser. No. 258,113
1 Claim. (Cl. 43—42.5)

This invention relates to a novel and improved trolling lure or spoon.

This is a continuation of application Serial No. 863,347, filed December 31, 1959, now abandoned.

The primary object of the invention is the provision of a trolling spoon which, while being effective in low speed trolling, is especially designed for the high speed trolling, such as is incidental to the operation of motor boats, and which has the extra stability in the water which is necessary to eliminate or reduce wide amplitude and erratic movements in the water which are incidental to high speed trolling with present trolling lures and which reduces the fish-attracting and fish-catching effectiveness of such lures.

Another object of the invention is to provide a spoon of the character indicated above which is suitable for and unusually effective in trolling, casting, or spin-casting, and avoids undesired axial rolling or spinning in the water, and uncontrolled lateral darting, and which, instead, provides for a substantially horizontal serpentine movement while the spoon is vertical in the water.

A further object of the invention is to provide a lure of the character indicated above which is simple and uncomplex in formation, so as to be producible at relatively low cost, takes up minimum space in the fisherman's kit, can be nested for compact shipment and storage, and which can be made in various sizes, with compensating greater weight for the smaller sizes.

Other important objects and advantageous features of the invention will be apparent from the following description and the accompanying drawings, wherein, for purposes of illustration only, a specific form of the invention is set forth in detail.

In the drawings:

FIGURE 1 is a plan view of a lure of the present invention, equipped with a gang hook and a lure attaching swivel;

FIGURE 2 is an edge elevation taken from the right of FIGURE 1;

FIGURE 3 is a central longitudinal section taken on the line 3—3 of FIGURE 1; and FIGURE 4 is a transverse section taken on the line 4—4 of FIGURE 1.

Referring in detail to the drawings, wherein like numerals designate like parts throughout the several views, the illustrated lure comprises a longitudinally elongated rigid body 10 of symmetrical axially elongated elliptical shape in plan, and made of uniform thickness plate or sheet material, preferably metal. Thinner or lighter weight metal is used in the larger sizes of lures, and heavier and/or thicker metal is used in the smaller sizes, so as to compensate for the tendency, otherwise existing in the smaller sizes, of vagrant and unstable action in the water.

The lure body 10 comprises similar spear-shaped or elongated, semi-elliptical forward and rear portions 12 and 14, respectively, which are laterally displaced relative to each other and lie in parallel planes. The portions 12 and 14 are oppositely spooned, that is, have similar but reversed convex and concave sides 16 and 18, respectively, which increase gradually in depth from the outer ends of the portions 12 and 14 to their inward ends.

At their inward ends, the portions 12 and 14 are joined to and merge into a forty-five degree diagonal intermediate portion 20, which, as shown in FIGURES 2 and 3, is substantially flat, and is curved only at its ends where the intermediate portion 20 is merged and flared into the inward ends of the portions 12 and 14, as indicated at 22 and 24, respectively.

At the forward end of the forward lure body portion 12 a hole 26 is provided and has engaged therethrough a swivel attaching ring 28, and a similar ring 30 is engaged through a hole 32 provided in the rear end of the rear body portion 14, for attaching a gang hook 34.

It is to be noted that the side edges 36 and 38 of each of the portions 12 and 14 are in the same plane and that the convex surfaces 40 of the forward and rear body portions 12 and 14, respectively, are longitudinally uncurved for a major portion of their lengths, and that the portions 12 and 14 have relatively shallow concavities and convexities, so that the portions 12 and 14 are in a sense flat portions extending in laterally offset parallel longitudinal planes, relative to which the substantially flat intermediate portion 20 is angled at substantially forty-five degrees.

When the lure is drawn forwardly through the water, by a line attached to a swivel 42 attached to the ring 28 it shifts immediately to a vertical position, and while in such vertical position, moves in a serpentine path in a generally horizontal plane smoothly and with precision through the water, this serpentine movement being caused by the oppositely concave-convex portions 12 and 14 with the offset, uniplanar side edges of each of said portions.

Proper dimensions for lures of the present invention are on the order of a width, at the intermediate portion 20 of three-quarter inches for a three inch long lure, and on the order of one-half inch for a four inch long lure.

Although there has been shown and described herein a preferred form of the invention it is to be understood that the invention is not necessarily confined thereto, and that any change or changes in the structure of and in the relative arrangement of components thereof are contemplated as being within the scope of the invention as defined by the claim appended hereto.

What is claimed is:

A fishing lure particularly adapted to high speed trolling comprising:

(a) an elongated, narrow lure body;

(b) the lure body including forward and rear portions integrally connected at their proximal ends and being tapered from their proximal ends toward their distal ends whereby the lure body is of elliptical form;

(c) means at the forward end of the lure body for securing a fishing line thereto;

(d) the forward and rear portions of the lure body each having only one centrally located concave-convex section, the concavities of said sections being oppositely facing the respective concave-convex sections being merged into one another at an intermediate portion of the lure body;
(e) the side and forward edges of said forward section lying in a single plane, and the side and rear edges of said rear section lying in a single plane;
(f) the edges of the forward and rear sections being in spaced and parallel planes;
(g) the plane of the rear section being offset from the plane of the forward section; and
(h) a trailing hook secured to the rear section of the lure body.

References Cited in the file of this patent
UNITED STATES PATENTS

| | | |
|---|---|---|
| 728,360 | Breidenstein | May 19, 1903 |
| 1,589,258 | Stanley | June 15, 1926 |
| 1,692,674 | Mapel | Nov. 20, 1928 |
| 1,742,934 | Richardson | Jan. 7, 1930 |
| 1,852,620 | Martin | Apr. 5, 1932 |
| 1,924,350 | Cordell | Aug. 29, 1933 |
| 1,969,944 | Reinard | Aug. 14, 1934 |
| 2,214,266 | Haury | Sept. 10, 1940 |
| 2,774,170 | Baker | Dec. 18, 1956 |